United States Patent [19]
Terunuma et al.

[11] Patent Number: 5,570,151
[45] Date of Patent: Oct. 29, 1996

[54] CAMERA WHICH OPERATES A SHUTTER ACCORDING TO A PHOTOGRAPHER'S WINK AND THE VIBRATION LEVEL

[75] Inventors: Hiroshi Terunuma, Yachiyoshi; Hiroshi Wakabayashi, Yokohama; Daiki Tsukahara, Hiratsuka, all of Japan

[73] Assignee: Nikon Corporation, Tokyo, Japan

[21] Appl. No.: 363,859

[22] Filed: Dec. 27, 1994

[30] Foreign Application Priority Data

Dec. 27, 1993 [JP] Japan .................................. 5-330796
Dec. 30, 1993 [JP] Japan .................................. 5-354436

[51] Int. Cl.$^6$ ............................ G03B 7/00; G03B 17/38
[52] U.S. Cl. ............................ 396/52; 396/263; 396/502
[58] Field of Search .................................. 354/410, 432, 354/219, 266; 348/335

[56] References Cited

U.S. PATENT DOCUMENTS

| | | | |
|---|---|---|---|
| 4,576,459 | 3/1986 | Miura et al. | 354/287 |
| 5,204,709 | 4/1993 | Sato | 354/266 |
| 5,459,511 | 10/1995 | Uehara et al. | 354/410 X |

FOREIGN PATENT DOCUMENTS 61-160436 10/1986 Japan .
6-75272 3/1994 Japan .

Primary Examiner—D. Rutledge

[57] ABSTRACT

A camera which releases the shutter based on the wink of a photographer when vibrations are affecting the camera. The camera includes a wink detection device which detects a wink of the photographer and produces a corresponding wink detection output signal, and a vibration detection device which detects vibrations affecting the camera and produces a corresponding vibration detection signal. A control mechanism is responsive to the wink detection output signal and the vibration detection signal to control the release of the shutter. The wink detection device operates by emitting a visible light signal towards the photographer's eye, reflecting the signal off the photographer's eye, and then receiving the reflected signal. A wink of the photographer is detected based on the amount of reflected light received by the light receiving device. The wink detection device includes an LED which emits the signal. The LED can also operate as an indicator in the viewfinder to notify the photographer that the shutter will be released upon a wink. A cover member can be arranged between the camera and the face of the photographer to protect the wink detection device and the photographer's eye from being exposed to dust and particles, thereby preventing unintended blinking or inaccurate detection of a wink.

20 Claims, 6 Drawing Sheets

CAMERA WHICH OPERATES A SHUTTER ACCORDING TO A PHOTOGRAPHER'S WINK AND THE VIBRATION LEVEL

BACKGROUND OF THE INVENTION

1. Field of the Invention

The present invention relates to a wink release camera to perform shutter release by detection of a wink by the photographer and, more particular, to an improved wink release camera which operates in a wink release mode only when a high level of vibrations are occurring during photography.

2. Description of the Related Art

Wink release cameras operate the camera's shutter release based on the detection of a "wink" by a photographer, thereby avoiding vibration or hand tremors which can result from the manual pressing of a shutter release button. A wink release camera which uses an infrared mechanism to detect a wink is disclosed in Japanese Laid-Open Patent Publication 5-40303. A faint infrared light is radiated towards the photographer's eye. The infrared light is reflected off the photographer's eye and received by a detection sensor. A wink can be detected by an analysis of the received, reflected light. The shutter release then can operated based on the detection of the wink.

However, erroneous detection of a wink can occur from dust or other particles passing the detection region of the detection sensor. In addition, a person that frequently blinks may unintentionally cause the shutter release to be operated, thereby taking an unintended photograph. Also, an unintentional shutter release operation can be caused by inadvertent closure of the photographer's eye. Such inadvertent closure occurs often when the surrounding ambient light is very bright, when dust enters the photographer's eye, or when wind hits the photographer.

SUMMARY OF THE INVENTION

Accordingly, it is an object of the present invention to provide a camera that operates in a wink release mode only when it is necessary to use a wink release, thereby suppressing inadvertent release of the shutter caused by inadvertent blinking when the camera is unnecessarily in wink release mode.

It is a further object of the present invention to provide a camera that operates in a wink release mode only when a high level of vibrations are affecting the camera, such as vibrations due to hand tremors.

It is a further object of the present invention to provide a camera that has a wink release function and has a protective eye-pad to prevent wind, dust and other particles from entering the eye and causing inadvertent blinking.

It is a further object of the present invention to provide a camera that has a wink detection device to detect a wink of a photographer and has a protective eye-pad to prevent wind, dust and particles from crossing the detection region of the wink detection device and causing inaccurate detection of a wink.

It is a still further object of the present invention to provide a camera that has a wink release detection device which uses a light emitting diode to emit a signal towards the photographer's eye to detect a wink, wherein the light emitting diode also functions as an indicator to inform a photographer looking through the viewfinder that the camera is operating in a wink release mode.

Additional objects and advantages of the invention will be set forth in part in the description which follows and, in part, will be obvious from the description, or may be learned by practice of the invention.

Objects of the present invention are achieved by providing a camera comprising a wink detection device which detects a wink of a photographer and produces a corresponding wink detection output signal; a vibration detection device which detects vibrations affecting the camera and produces a corresponding vibration detection signal; a shutter which is released to take a photograph; and a control mechanism which is responsive to the wink detection output signal and the vibration detection signal to control the release of the shutter.

Objects of the present invention are also achieved by providing a camera comprising a viewfinder; a shutter which is released to take a photograph; a wink detection device which detects a wink of a photographer looking through the viewfinder by emitting a signal toward the photographer's eye to reflect the signal off the photographer's eye, receiving the reflected signal, and detecting a wink based on the received, reflected signal, the wink detection device producing a wink detection output signal corresponding to the detection of a wink; a control mechanism which is responsive to the wink detection output signal to control the release of the shutter; and a cover member which covers the emitted signal as it travels towards the photographer's eye and the reflected signal as it travels from the photographer's eye to be received by the wink detection device, thereby protecting the wink detection device and the photographer's eye from wind and particles.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1A:
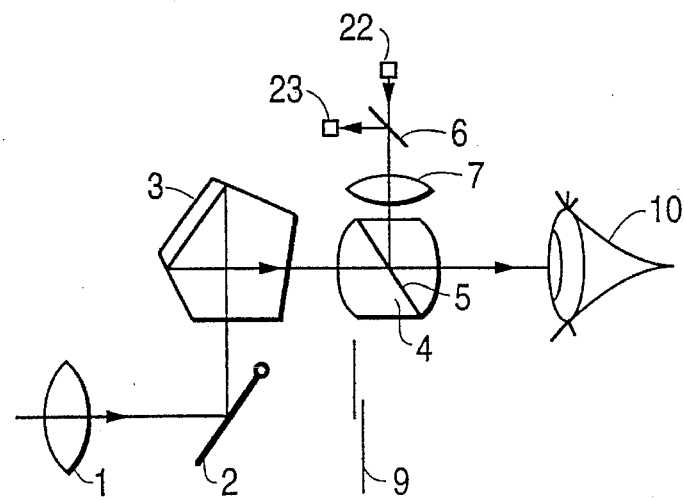
FIGS. 1(A), 1(B) and 1(C) are a vertical section view, horizontal section view, and back view, respectively, of an embodiment of a camera according to the present invention.

Reference will now be made in detail to the present preferred embodiments of the present invention, examples of which are illustrated in the accompanying drawings, wherein like reference numerals refer to like elements throughout.

FIG. 1(A) is a vertical cross section view of an embodiment of a camera according to the present invention as applied to a single lens reflex ("SLR") camera. In FIG. 1(A), photographic light collected by a photographic lens 1 is reflected by a mirror 2 and irradiates a pentaprism 3. After being inverted up and down and left and right by pentaprism 3, the photographic light irradiates the photographer's eye 10 via an ocular lens unit 4. After mirror 2 is rotated in a clockwise direction in FIG. 1(A), exposure of film (not illustrated) is performed by the opening of a shutter 9 so that the photographic light irradiates the film.

In order to detect a wink of the photographer without contacting the eye, a light emitting diode (LED) 22 and a photodetector (PD) 23 are arranged above ocular lens unit 4. LED 22 emits light of a visible wavelength and PD 23 is sensitive to this wavelength of light. Light emitted by LED 22 passes through a semi-reflecting mirror 6 and a condensing lens 7, is reflected by a semi-reflecting mirror 5, and is irradiated on the photographer's eye. Semi-reflecting mirror 5 is inserted in ocular lens unit 4.

When the photographer's eye is opened, light reflected by the cornea is reflected by semi-reflecting mirror 5 and semi-reflecting mirror 6 and is incident on PD 23. Moreover, when the photographer's eye is closed, light reflected by the eyelid is reflected by semi-reflecting mirror 5 and semi-reflecting mirror 6 and is incident on PD 23. Because the reflectivities of the cornea and the eyelid differ greatly, the open or closed state of the photographer's eye can be detected by the amount of light incident on PD 23.

Figure 1B:
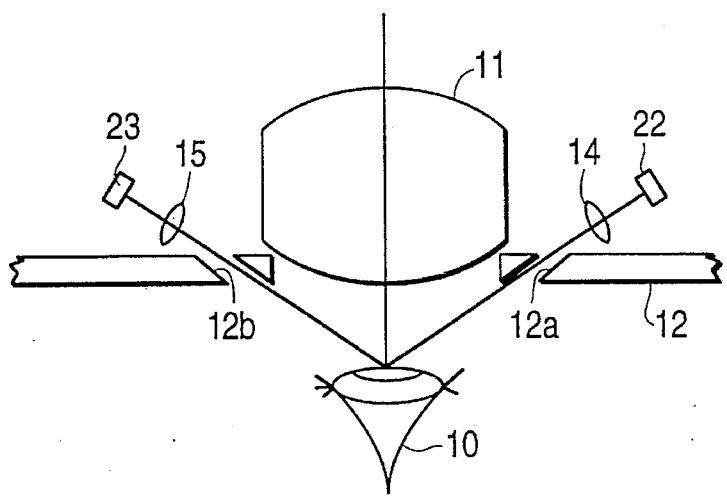

FIG. 1(B) is a horizontal section view of an embodiment of a camera according to the present invention. In FIG. 1(B), the photographic light irradiates the photographer's eye 10 via an ocular lens 11. LED 22 and PD 23 are arranged left and right of ocular lens 11 to detect a wink of the photographer without contacting the photographer's eye. A viewfinder frame 12 has apertures 12a and 12b. When the photographer's eye is open, light emitted by LED 22 is condensed by a condensing lens 14, passes through aperture 12a, irradiates the photographer's eye, reflects off the cornea, passes through aperture 12b, is condensed by a condensing lens 15, and is incident on PD 23. Moreover, when the photographer's eye is closed, light emitted by LED 22 is reflected by the eyelid, passes through aperture 12b, is condensed by condensing lens 15, and is incident on PD 23. Because the reflectivities of the cornea and the eyelid differ greatly, the wink of the photographer's eye can be detected by the amount of light incident on PD 23.

Figure 1C:
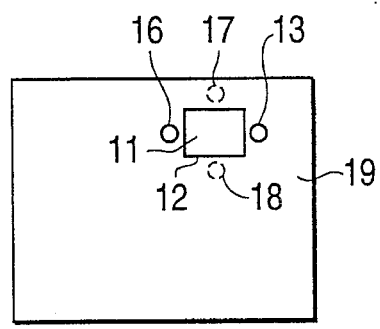

FIG. 1(C) is a back view of an embodiment of a camera according to the present invention. As illustrated in FIG. 1(C), viewfinder frame 12 is formed in the camera body 19. LED 22 and PD 23 are arranged to the left and right of ocular lens 11 and are preferably located in positions 13 and 16. If LED 22 and PD 23 were arranged in positions 17 and 18, the eyelashes of the photographer would hinder the detection of a wink.

Figure 2:
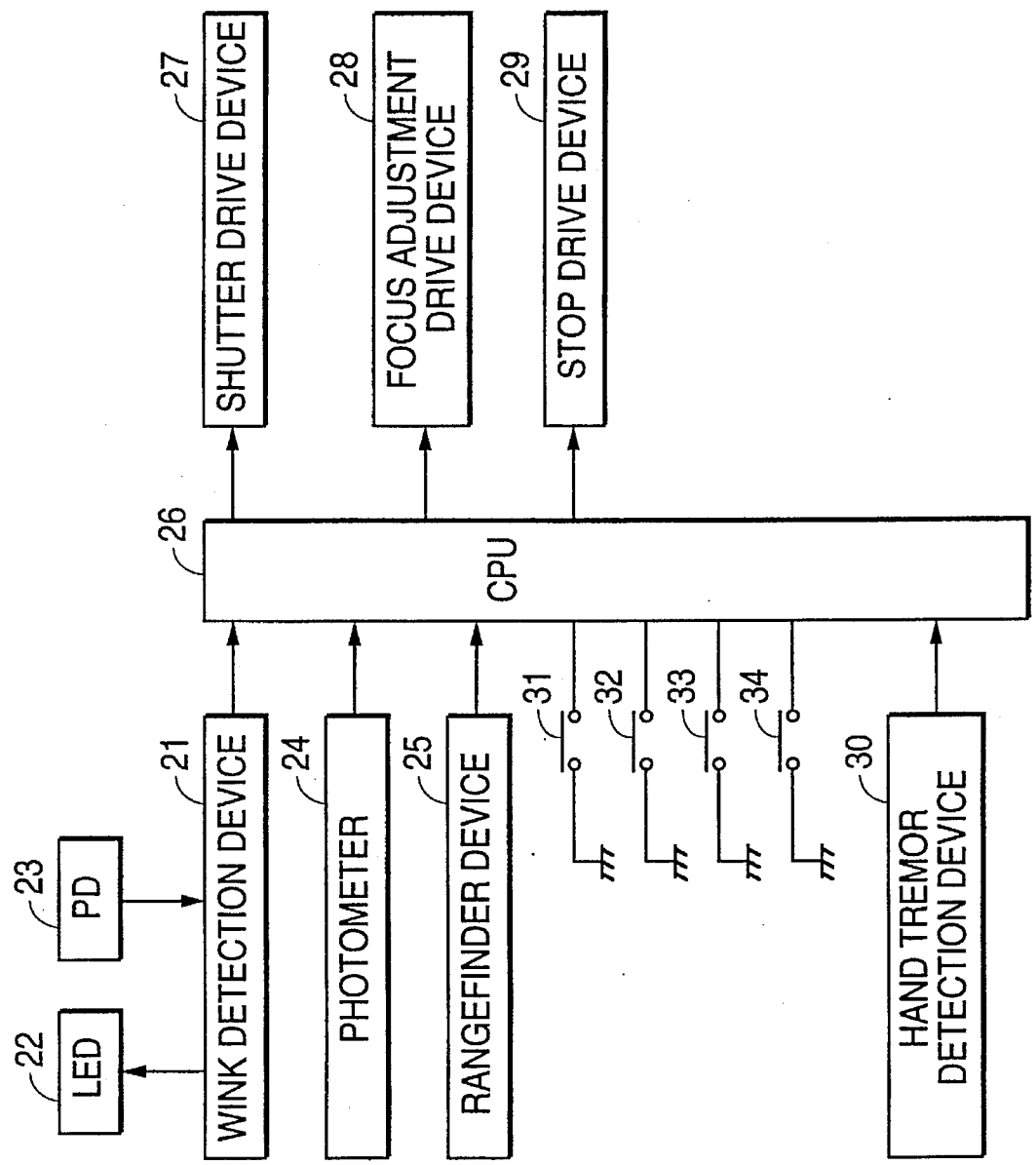
FIG. 2 is a block diagram illustrating an embodiment of a camera according to the present invention.

FIG. 2 is a block diagram illustrating an embodiment of a camera according to the present invention. As illustrated in FIG. 2, LED 22 and PD 23 are connected to a wink detection device 21 which provides a detection output to a CPU 26. Wink detection device 21 causes LED 22 to emit light which irradiates the photographer's eye. PD 23 produces a detection output which corresponds to the amount of light incident on PD 23 and the detection output is provided to CPU 26 via wink detection device 21. In order to exclude effects of external light on the detection by PD 23, it is desirable to include a predetermined modulation to the light emitted by LED 22 and received by PD 23. Wink detection device 21 is illustrated and described as being a separate device from LED 22 and PD 23; however, wink detection device 21 can also be described as comprising LED 22 and/or PD 23.

A photometer device 24 and a rangefinder device 25 are connected to CPU 26 and produce output signals corresponding to photometry and rangefinding functions, respectively. The output signals of photometer device 24 and rangefinder device 25 are provided to CPU 26. Photometer devices and rangfinder devices are well-known in the art. Moreover, a hand tremor detection device 30 determines whether or not vibrations are occurring. An angular acceleration detection device can be used with hand tremor detection device 30 to detect hand tremors. Devices which detect vibrations or hand tremors in cameras are well-known in the art. The output of hand tremor detection device 30 is provided to CPU 26. CPU 26 controls a shutter drive device 27, a focus adjustment device 28, and a stop drive device 29 based on the outputs of wink detection device 21, photometer device 24, and rangefinder device 25. Shutter drive devices, focus adjustment devices and stop drive devices are well-known in the art.

CPU 26 has various control states which are determined by the operation of a half depression switch 31, a full depression switch 32, a changeover switch 33 and a cancel switch 34. Half depression switch 31 and full depression switch 32 are controlled by the photographer by a two-step switch (not illustrated) that operates as the camera's release button. This release button is pressed by the photographer and is preferably located on the top surface of camera body 19. Half depression switch 31 is set ON by half depression of the release button by a photographer. Full depression switch is set ON by full depression of the release button by a photographer. Changeover switch 33 is operative by the photographer to change over between manual release and wink release. Changeover switch 33 is preferably located on the top surface of camera body 19. Cancel switch 34 can be operated by a photographer to cancel a previously performed operation.

Figure 3:
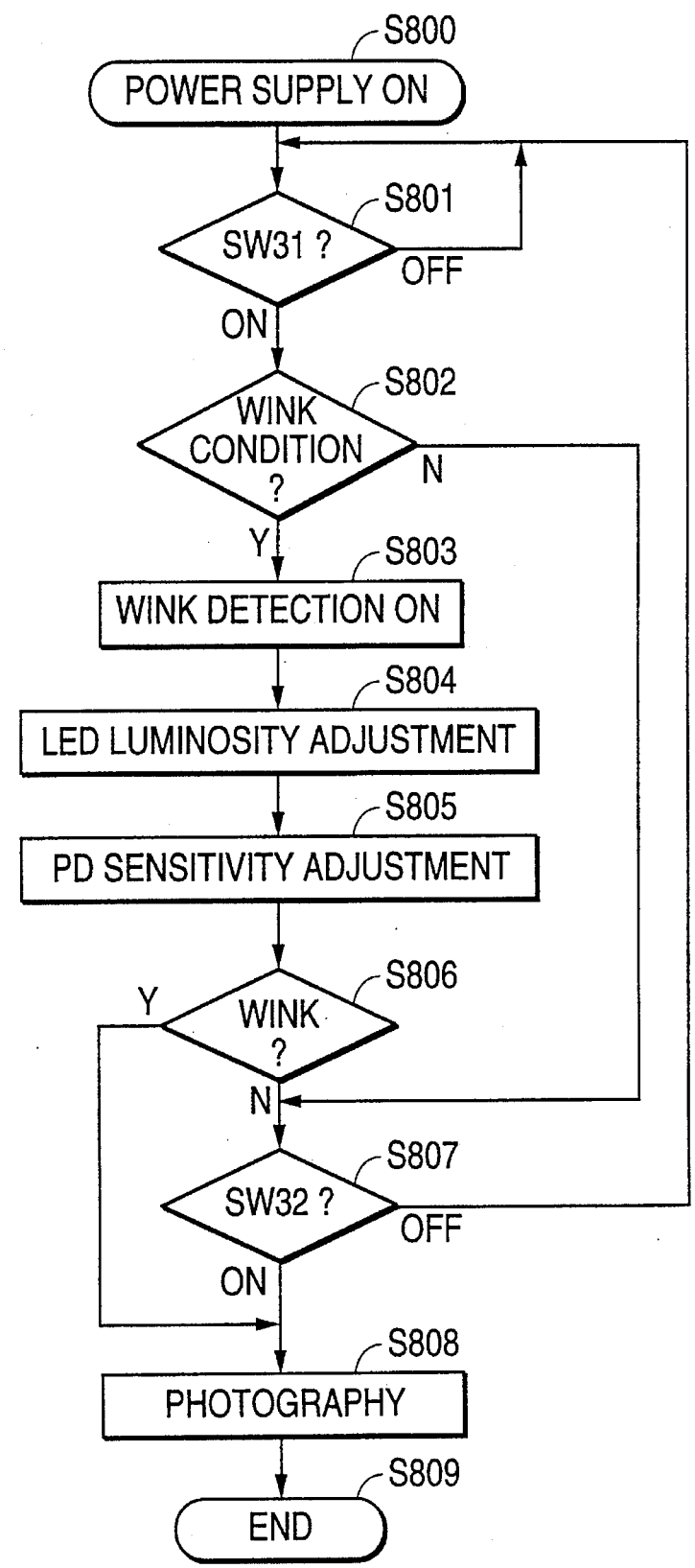
FIG. 3 is a flow chart illustrating the operation of a camera according to an embodiment of the present invention.

FIG. 3 is a flow chart illustrating the operation of a camera according to an embodiment of the present invention. The camera has a wink release mode where the shutter is operated and photographs are taken when the photographer winks. The camera also has a manual release mode where the shutter is operated and photographs are taken when the photographer fully presses the release button. Generally, according to FIG. 3, the camera operates in the wink release mode when a predetermined level of hand tremor or vibration is detected, and operates in the manual release mode when the predetermined level of hand tremor or vibration is not detected. When in wink release mode, a shutter release is performed at each wink by the photographer. The process starts in step S800 by switching the camera's power source ON. In step S801, the process waits for half depression switch 31 to be ON. When half depression switch becomes ON, it is determined whether the camera should enter wink release mode or should be in manual release mode. Generally, if the amount of hand tremor is above a predetermined level, the camera is subject to a high degree of vibration and, therefore, wink release is necessary since manual pressing of the release button will produce more vibration or enhance the existing vibration. If the amount of hand tremor is below a predetermined level, the camera is not subject to a high degree of vibration and the manual operation of the release button is allowed. Therefore, the occurrence of hand tremors or vibrations is determined in step S802 from the output of hand tremor detection device 30. When hand tremors or vibrations occur, the amount of hand tremor or vibration is compared to a predetermined level. When the amount of hand tremor is less than the predetermined level, wink release mode is unnecessary and the process moves to step S807. If the amount of hand tremor is at or above the predetermined level, wink release mode is necessary and the process moves to step S803.

If it is determined that wink release mode is necessary in step S802, the process moves to step S803 where the camera prepares for the detection of a wink. Therefore, in step S803, wink detection is set ON and the output of wink detection device 21 is made available to CPU 26. Also in step S803, light is emitted by LED 22 of wink detection device 21, entering the wink release mode is displayed so that the photographer is aware of wink release operation, and additional preparatory actions of wink detection are performed. Preferably, an indicator is lit in the viewfinder to inform the photographer that the camera has entered wink release mode while the photographer is looking through the viewfinder. In step S804, the luminosity of LED 22 is adjusted based on the reflected light output and the ambient light. Next, adjustment of the sensitivity of PD 23 is performed in step S805.

A wink is awaited in step S806. When a wink is detected in step S806 by wink detection device 21, the process moves to step S808 where photography is performed. After photography is performed in step S808, the process ends in step S809. When there is no wink in step S806, the process moves to step S807 where it is determined whether or not full depression switch 32 is ON. When full depression switch 32 is ON, photography is performed in step S808 and then the process ends in step S809. If full depression switch 32 is not ON in step S807, the process returns to step S801 and the abovementioned steps are repeated. Moreover, in step S806, release is also performed by moving to step S808 when full depression switch 32 is changed to ON before a wink. Therefore, when the process is at step S806, the photographer can perform photography without winking by fully pressing the release button. Thus, CPU 26 and shutter drive device 27 can be described as a control mechanism which controls the release of shutter 9.

FIG. 3 can be modified so that the camera operates in wink release mode or manual release mode based on the shutter speed. For example, the processing sequence of FIG. 3 can be modified so that the camera operates in wink release mode when hand tremors or vibrations are detected and the shutter speed is less than or equal to a predetermined value and operates in manual release mode when the shutter speed is greater than the predetermined value. In such an embodiment, FIG. 3 would be modified so that, in step S802 after hand tremors or vibrations are detected, the shutter speed is compared to a predetermined value. If the shutter speed is less than or equal to the predetermined value in step S802, the process would move to step S803 and wink detection is set ON. If the shutter speed is greater than the predetermined value in step S802, wink release is not necessary and the process would move to step S807. Therefore, in this embodiment, it is not necessary to determine the amount of hand tremors or vibrations. It is only necessary to determine that hand tremors or vibrations are occurring. If hand tremors or vibrations are occurring, then the camera operates in wink release mode if the shutter speed is less than or equal to a predetermined value.

FIG. 3 can also be modified so that the camera operates in wink release mode or manual release mode based on the exposure value of photographic light incident on the camera. For example, the processing sequence of FIG. 3 can be modified so that the camera operates in wink release mode when hand tremors or vibrations are detected and the exposure value is less than or equal to a predetermined value and operates in manual release mode when the exposure value is greater than the predetermined value. In such an embodiment, FIG. 3 would be modified so that, in step S802 after hand tremors or vibrations are detected, the exposure value is measured by photometer 24 and is compared to a predetermined value. If the exposure value is less than or equal to the predetermined value in step S802, the process would move to step S803 and wink detection is set ON. If the exposure value is greater than the predetermined value in step S802, wink release is not necessary and the process would move to step S807. Therefore, in this embodiment, it is not necessary to determine the amount of hand tremors or vibrations. It is only necessary to determine that hand tremors or vibrations are occurring. If hand tremors or vibrations are occurring, then the camera operates in wink release mode if the exposure value is less than or equal to a predetermined value. A camera which operates a shutter according to the wink of a photographer is disclosed in commonly-assigned U.S. patent application titled "A CAMERA HAVING A WINK OPERATED SHUTTER RELEASE", Ser. No. 08/180,150, filed Jan. 11, 1994.

According to the above described embodiments of the present invention, the camera automatically changes from manual release mode to wink release mode to reduce the effect of hand tremors or vibrations on photographs. The changeover is an automatic and simple process. While FIG. 3 illustrates the processing sequence of a camera according to an embodiment of the present invention which automatically performs changeover to wink release mode from manual release mode, the changeover may be performed by a manual switch (such as changeover switch 33) being pressed by the photographer.

Moreover, according to the above described embodiments of the present invention and as described above for step S803 in FIG. 3, an indicator is lit in the viewfinder to inform the photographer that the camera has entered wink release mode. Moreover, LED 22 can be made to emit visible light, wherein PD 23 receives the visible light emitted by LED 22. Therefore, since LED 22 emits visible light, LED 22 can also be used as the indicator in the viewfinder or to light the indicator in the viewfinder. In this manner, instead of having a separate LED for use by wink detection device 21 and a separate indicator, LED 22 has dual functions of acting as a wink mode indicator and as the light emitting portion of a wink detection device, thereby reducing camera costs and allowing smaller camera size. CPU 26 can act as an adjustment mechanism which is responsive to the amount of light received by PD 23 and thereby adjust the amount of light emitted by LED 22 and/or the sensitivity of PD 23.

As described in the above embodiments of the present invention, it is determined whether or not hand tremors are occurring. Based on this determination, the camera operates in either wink release mode or manual release mode. If hand tremors are occurring, the camera is switched to wink release mode. If hand tremors are not occurring, the camera operates in manual release mode.

Figure 4:
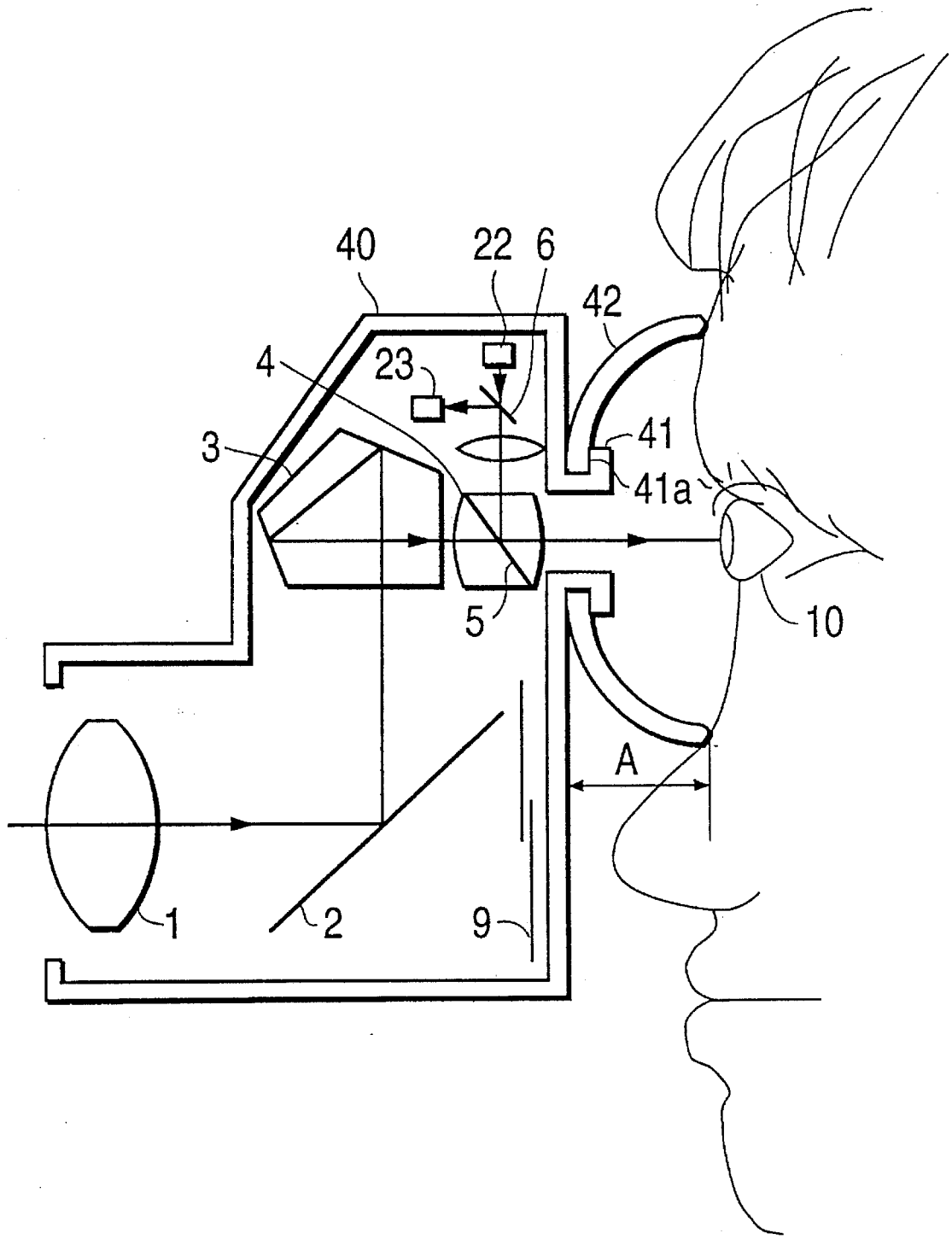
FIG. 4 is a vertical cross section view of an embodiment of a camera according to the present invention.

FIG. 4 is a vertical cross section view of an embodiment of a camera according to the present invention. In FIG. 4, photographic light collected by photographic lens 1 is reflected by mirror 2 and irradiates pentaprism 3. The photographic light, after being inverted up and down and left and right by pentaprism 3, irradiates the photographer's eye 10 via ocular lens unit 4. The exposure of film is performed by shutter 9 opening after mirror 2 has rotated clockwise in FIG. 4, so that the photographic light irradiates the film.

To detect a wink of the photographer without contacting the photographer's eye or face, LED 22 and a PD 23 are arranged above ocular lens unit 4. The light generated by LED 22 passes through semi-reflecting mirror 6, is reflected by semi-reflecting mirror 5, and irradiates the photographer's eye. Semi-reflecting mirror 5 is included in ocular lens unit 4.

An eyepiece portion 41 of the viewfinder in the camera body 40 has a concave portion 41a arranged therein. An eyepiece eye-pad 42 is built Into concave portion 41a. Eye-pad 42 is fitted into concave portion 41a to prevent eye-pad 42 from falling out. By using silicone rubber and similar materials for the construction of eye-pad 42, eye-pad 42 has a degree of pliability to form to the shape of the photographer's face when in contact with the photographer's face. When a photographer is looking into the viewfinder so that the photographer's eye is placed at a point in which the viewfinder image is not eclipsed, the thickness A of eye-pad 42 collapses to some degree.

When the photographer's eye is open, light reflected from the cornea is reflected by semi-reflecting mirror 5 and semi-reflecting mirror 6 and is incident on PD 23. When the photographer's eye is closed, light reflected by the eyelid is reflected by semi-reflecting mirror 5 and semi-reflecting mirror 6 and is incident on PD 23. Because the reflectivities of the cornea and the eyelid differ greatly, an opening and closing of the photographer's eye can be detected by the amount of light incident on PD 23.

Figure 5:
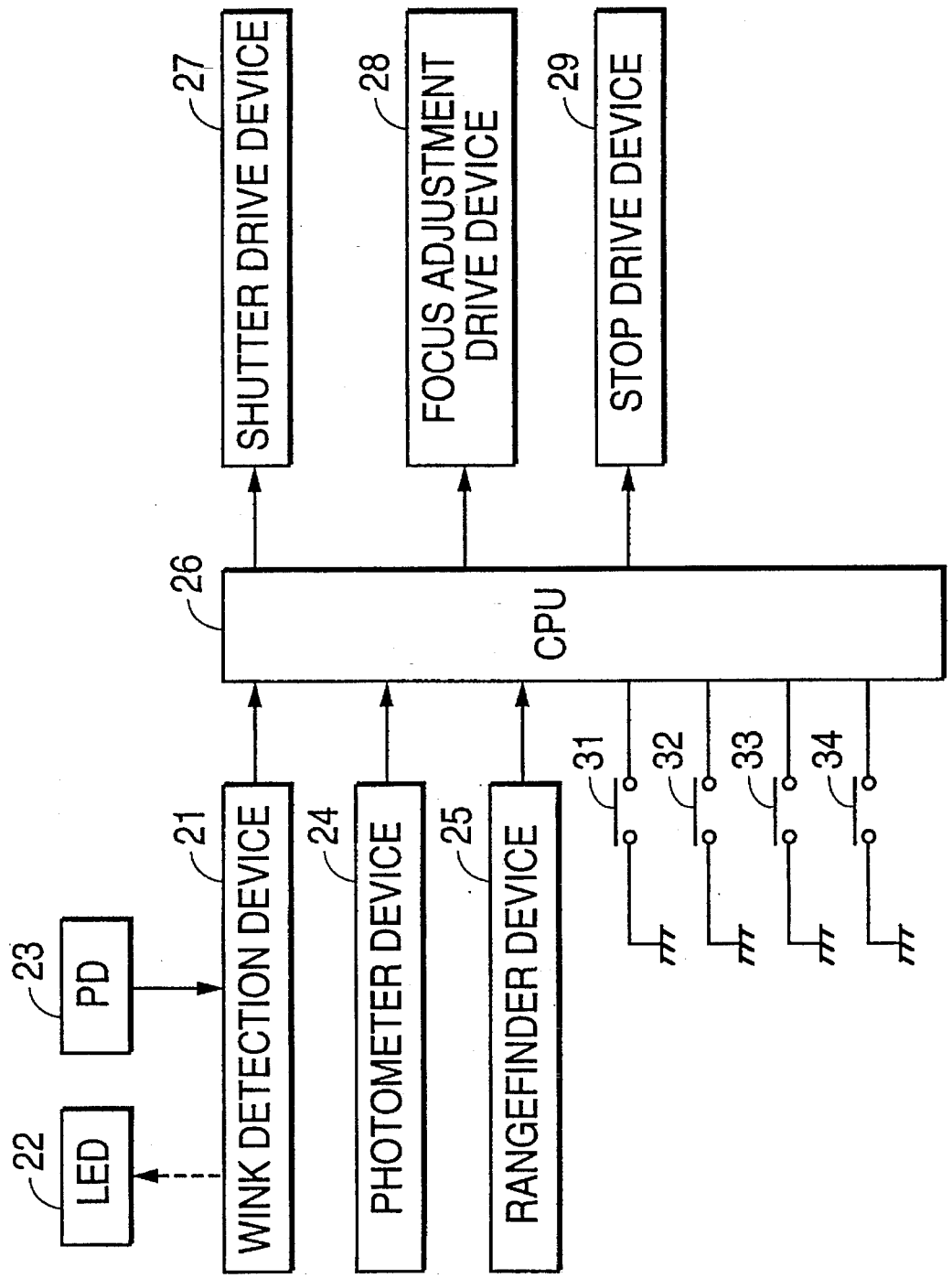
FIG. 5 is a block diagram illustrating an embodiment of a camera according to the present invention.

As shown in FIG. 5, LED 22 and PD 23 are connected to wink detection device 21. The wink detection device 21 provides a detection output to CPU 26. Photometer device 24 and rangefinding device 25 are connected to, and provide outputs to, CPU 26. Based on the outputs of wink detection device 21, photometer device 24 and rangefinder device 25, CPU 26 controls shutter drive device 27, focus adjustment device 28, and stop drive device 29. The control state of CPU 26 can be selectively changed over by operating half depression switch 31, full depression switch 32, changeover switch 33 and cancel switch 34. Wink detection device 21, photometer device 24, rangefinding device 25, shutter drive device 27, focus adjustment device 28 and stop drive device 29 were discussed above in relation to FIG. 2 and, therefore, a further description of these devices is omitted.

Figure 6:
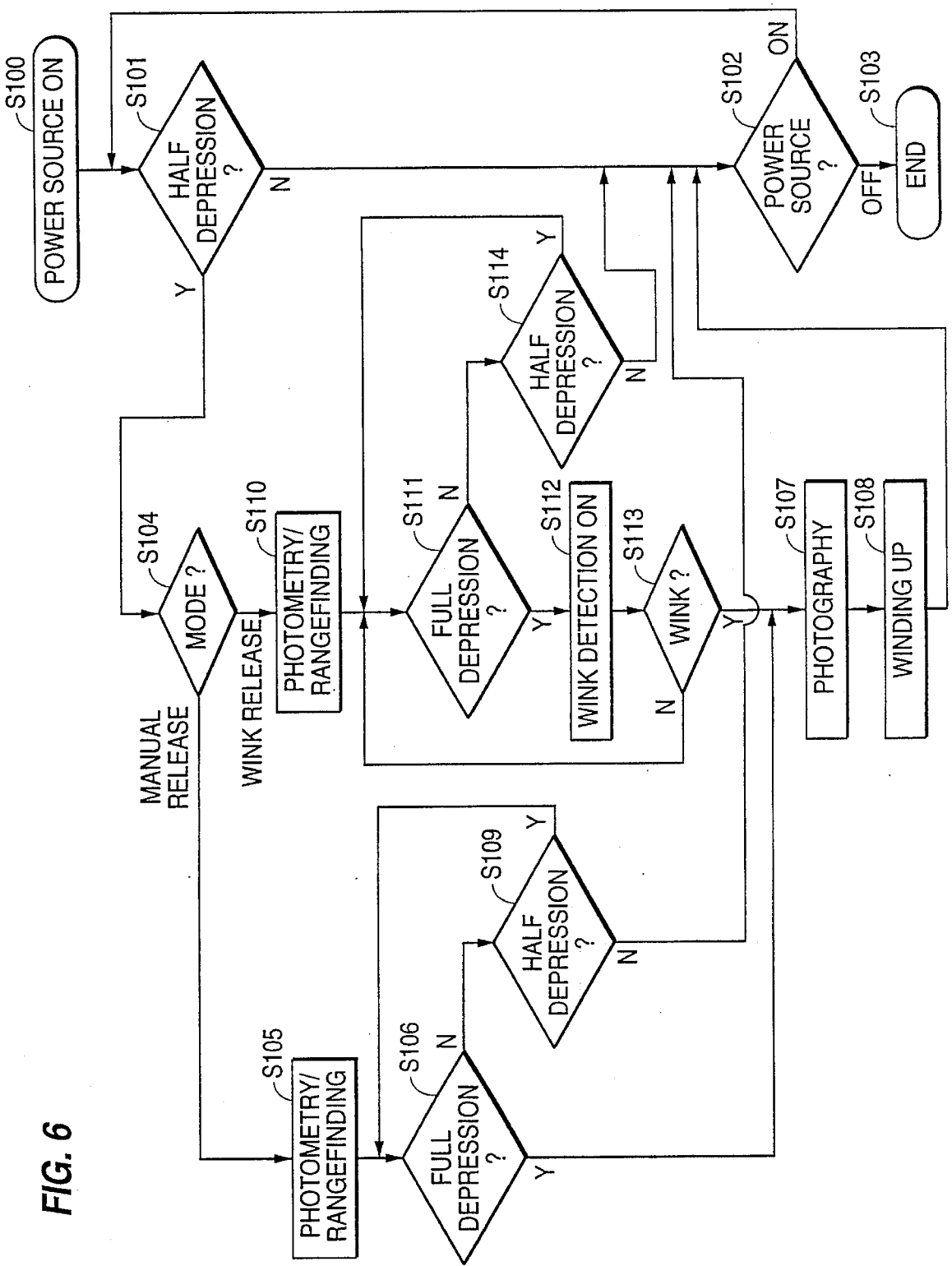
FIG. 6 is a flow chart illustrating the operation of a camera according to an embodiment of the present invention.

FIG. 6 is a flow chart illustrating the operation of a camera according to an embodiment of the present invention.

According to FIG. 6, the camera operates in either wink release mode or manual release mode based on the mode selected by changeover switch 33. When in wink release mode, one photograph is taken on each wink. The process starts in step S100 by switching the camera's power source ON. In step S101, it is determined whether or not half depression switch 21 is ON or OFF. If half depression switch 31 is OFF, the process moves to step S102 and the state of the power source is determined. If the power switch is ON in step S102, the process returns to step S101; if the power switch is OFF in step S102, the process ends in step S103. If half depression switch 31 is ON in step S101, the process moves to step S104 where it is determined whether changeover switch 33 is switched to manual release mode or wink release mode. If changeover switch 33 is in manual release mode in step S104, the process moves to step S105 where photometry and rangefinding are performed and, in step S106, it is determined whether or not full depression switch 32 is ON (release button is fully depressed) or OFF (release button is not fully depressed). If full depression switch 32 is ON in step S106, the process moves to step S107 where photography is performed, and then to step S108 where film wind-up is performed. Thereafter, the process moves to step S102.

If it was determined in step S106 that full depression switch 32 is OFF, the process moves to step S109 and it is determined whether half depression switch S31 is ON or OFF. If half depression switch 31 is OFF, it is determined that photography has stopped and, therefore, the process moves to step S102. If half depression switch 31 is ON in step S109, the process returns to step S106 and awaits full depression switch 32 being ON (release button is fully depressed).

If the system is in wink release mode in step S104, the process moves to step S110 where photometry and rangefinding are performed. Then, the process moves to step S111 where it is determined whether full depression switch 32 is ON or OFF. If full depression switch 32 is ON, the process moves to step S112 and wink detection device 21 is set ON. Thereafter, the process moves to step S113 where it is determined whether a wink has occurred. If it is determined in step S113 that the photographer winked, the process moves to step S107 where photography is performed and then to step S108 where film winding is performed. Then, the process moves to step S102.

In step S113, when the photographer has not winked, the process returns to step S111. When it is determined in step S111 that full depression switch 32 is OFF and also determined in step S114 that half depression switch 31 was OFF, photography has stopped and, therefore, the process moves to step S102. When half depression switch 31 is ON in step S114, the process moves to step S111 and the system waits for full depression switch 32 to be ON.

In the embodiment of the present invention as illustrated in FIGS. 4–6, an eye-pad is arranged on the viewfinder eyepiece portion. The eye-pad protects the eye and the wink detection device from wind, dust and particles. Specifically, the detection path between LED 22 and PD 23 is protected so that particles do not enter the detection path and produce erroneous detection of a wink. Moreover, an elastic member can be used as the eye-pad so that the eye-pad can be used with different photographers, even if the shapes of photographers' faces differ to some degree.

According to the embodiments of the present invention, a wink detection device detects, without contact, a wink of a photographer looking into the viewfinder. A shutter drive device performs release of the camera shutter based on the output of the wink detection device. An eye-pad or cover acts as a cover member to protect the eyepiece portion of the viewfinder and the wink detection device. Since the space between the viewfinder and the eye is protected by the cover member, the photographer's eye and the wink detection device are not affected by wind, dust and other particles. The cover member also prevents wind from drying the photographer's eye and causing undesirable blinking. In this manner, an erroneous winking action can be prevented.

In the above embodiment, eye-pad 42 is arranged at the periphery of a viewfinder eyepiece portion; however, embodiments of the present invention are not limited to this arrangement of eye-pad 42. For example, a camera side surface may be extended to the back side of the camera to provide protection from particles and light. Furthermore, an elastic member may be arranged to fit the side surface of the camera and also the top and bottom surface of the camera so that the elastic member conforms to the features of a photographer and prevents the undesirable effects of wind and particles. There are many other possible arrangements of a cover or eye-pad.

Many different types of wink release CPU processing sequence operations can be performed and embodiments of the present invention are not intended to be limited to the single wink process described in FIG. 3. For example, continuous photographs can be taken on one wink and can end on a second wink. Also, the process can be designed so that a photograph is taken on the second wink. There are countless other possibilities which can exist.

The embodiments of the present invention are described above in relation to "hand tremors". However, embodiments of the present invention are not intended to be limited to the operation in relation to hand tremors. For example, operation of the shutter release can be based on the detection of virtually any type of vibration. Also, the embodiments of the present invention described herein can be applied to virtually any type of camera, including single lens reflex, lens shutter, and other compact cameras.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera comprising:
   a wink detection device which detects a wink of a photographer and produces a corresponding wink detection output signal;
   a vibration detection device which detects vibrations affecting the camera and produces a corresponding vibration detection signal;
   a shutter which is released to take a photograph; and
   a control mechanism which is responsive to the wink detection output signal and the vibration detection signal to control the release of the shutter.

2. A camera as in claim 1, wherein the vibration detection signal indicates the amount of vibration affecting the camera and the control mechanism releases the shutter upon a wink of the photographer when the vibration detection signal indicates that the amount of vibration affecting the camera is above a predetermined level.

3. A camera as in claim 1, wherein the vibration detection device detects hand tremors affecting the camera and the vibration detection signal indicates the detection of hand tremors.

4. A camera as in claim 3, wherein the vibration detection signal indicates the amount of hand tremor affecting the camera and the control mechanism releases the shutter upon a wink of the photographer when the vibration detection signal indicates that the amount of hand tremor affecting the camera is above a predetermined level.

5. A camera as in claim 1, wherein the wink detection device comprises:
   a light emitting device which emits light towards the photographer's eye, the light being reflected off the photographer's eye; and
   a light receiving device which receives the light reflected off the photographer's eye, the wink detection device detecting a wink of the photographer based on the amount of reflected light received by the light receiving device.

6. A camera as in claim 2, wherein the wink detection device comprises:
   a light emitting device which emits light towards the photographer's eye, the light being reflected off the photographer's eye; and
   a light receiving device which receives the light reflected off the photographer's eye, the wink detection device detecting a wink of the photographer based on the amount of reflected light received by the light receiving device.

7. A camera as in claim 1, further comprising:
   a viewfinder; and
   a display device which displays an indicator to the photographer when vibrations are detected by the vibration detection device, the indicator being displayed inside the viewfinder to allow a photographer to see the indicator when the photographer is looking through the viewfinder.

8. A camera as in claim 7, wherein the display device emits light towards the photographer's eye, the light being reflected off the photographer's eye and the wink detection device further comprises a light receiving device which receives the light reflected off the photographer's eye, the wink detection device detecting a wink of the photographer based on the amount of reflected light received by the light receiving device.

9. A camera as in claim 8, wherein the display device emits visible light towards the photographer's eye, the visible light being reflected off the photographer's eye, and the light receiving device receives the visible light reflected off the photographer's eye.

10. A camera as in claim 8, further comprising a light adjustment mechanism which is responsive to the amount of light received by the light receiving device to adjust the amount of light emitted by the display device.

11. A camera as in claim 8, further comprising a light adjustment mechanism which is responsive to the amount of light received by the light receiving device to adjust the sensitivity of the light receiving device.

12. A camera as in claim 10, wherein the light adjustment mechanism is responsive to the amount of light received by the light receiving device to adjust the sensitivity of the light receiving device.

13. A camera as in claim 1, further comprising a shutter speed determination device which determines the shutter speed of the shutter, wherein the control mechanism releases the shutter upon a wink of the photographer when the vibration detection device detects vibrations affecting the camera and the shutter speed determination device determines that the shutter speed is less than or equal to a predetermined value.

14. A camera as in claim 1, further comprising a photometer device which measures the exposure value of photographic light incident on the camera, wherein the control mechanism releases the shutter upon a wink of the photographer when the vibration detection device detects vibrations affecting the camera and the exposure value measured by the photometer device is less than or equal to a predetermined value.

15. A camera as in claim 1, wherein the wink detection device detects a wink of the photographer by reflecting signals off the eye of the photographer, without directly contacting the face of the photographer.

16. A camera as in claim 2, wherein the wink detection device detects a wink of the photographer by reflecting signals off the eye of the photographer, without directly contacting the face of the photographer.

17. A camera comprising:
   a viewfinder;
   a shutter which is released to take a photograph;
   a wink detection device which detects a wink of a photographer looking through the viewfinder by emitting a signal toward the photographer's eye to reflect the signal off the photographer's eye, receiving the reflected signal, and detecting a wink based on the received, reflected signal, the wink detection device producing a wink detection output signal corresponding to the detection of a wink;

a control mechanism which is responsive to the wink detection output signal to control the release of the shutter; and a cover member which covers the emitted signal as it travels towards the photographer's eye and the reflected signal as it travels from the photographer's eye to be received by the wink detection device, thereby protecting the wink detection device and the photographer's eye from wind and particles.

18. A camera as in claim 17, wherein the cover member comprises an eye-pad which is positioned between the camera and the face of the photographer when the photographer is looking through the viewfinder.

19. A camera as in claim 17, wherein the cover member comprises an elastic member which presses against the face of the photographer when the photographer is looking through the viewfinder.

20. A camera as in claim 18, wherein the cover member comprises an elastic member which presses against the face of the photographer when the photographer is looking through the viewfinder.

* * * * *